(12) United States Patent
Boehm

(10) Patent No.: US 12,482,319 B2
(45) Date of Patent: Nov. 25, 2025

(54) MANAGING VEHICLE ACCESS WITHIN GEOGRAPHIC REGIONS BASED ON CLIMATE INPUT SIGNALS

(71) Applicant: Textron Innovations Inc., Providence, RI (US)

(72) Inventor: Christopher Boehm, North Augusta, SC (US)

(73) Assignee: Textron Innovations Inc., Providence, RI (US)

( * ) Notice: Subject to any disclaimer, the term of this patent is extended or adjusted under 35 U.S.C. 154(b) by 86 days.

(21) Appl. No.: 18/498,386

(22) Filed: Oct. 31, 2023

(65) Prior Publication Data

US 2025/0140048 A1   May 1, 2025

(51) Int. Cl.
*G07C 9/28* (2020.01)
*G01S 13/95* (2006.01)
*G01W 1/10* (2006.01)

(52) U.S. Cl.
CPC ............... *G07C 9/28* (2020.01); *G01S 13/95* (2013.01); *G01W 1/10* (2013.01)

(58) Field of Classification Search
None
See application file for complete search history.

(56) References Cited

U.S. PATENT DOCUMENTS

| | | | |
|---|---|---|---|
| 6,493,633 B2 | 12/2002 | Baron, Sr. et al. | |
| 6,590,529 B2 | 7/2003 | Schwoegler | |
| 6,753,784 B1 | 6/2004 | Sznaider et al. | |
| 7,289,908 B2 | 10/2007 | Root et al. | |
| 7,406,382 B2 | 7/2008 | Brulle-Drews | |
| 7,480,569 B2 | 1/2009 | Wehrlen et al. | |
| 7,898,438 B2 | 3/2011 | Brosius, III | |
| 8,180,502 B2 | 5/2012 | Satoh | |
| 8,489,127 B2 | 7/2013 | Huang et al. | |
| 8,531,293 B2 | 9/2013 | Putz | |
| 8,611,927 B2 | 12/2013 | Root et al. | |
| 9,060,248 B1 | 6/2015 | Coulombe et al. | |
| 9,066,464 B2 | 6/2015 | Schmidt et al. | |
| 9,170,114 B2 | 10/2015 | Uhlir et al. | |
| 9,421,440 B1 | 8/2016 | Chau | |
| 9,489,841 B1 * | 11/2016 | Huggins | E01F 9/615 |
| 9,936,346 B2 | 4/2018 | Koukoumidis et al. | |
| 10,021,514 B2 | 7/2018 | Root et al. | |

(Continued)

FOREIGN PATENT DOCUMENTS

| | | |
|---|---|---|
| AU | 2001277030 A1 | 1/2012 |
| AU | 2012200288 B2 | 7/2014 |

(Continued)

*Primary Examiner* — Fekadeselassie Girma
(74) *Attorney, Agent, or Firm* — BainwoodHuang

(57) ABSTRACT

A technique is directed to managing vehicle access within a geographic region. The technique involves receiving a set of climate input signals that defines climate for the geographic region. The technique further involves, based on the set of climate input signals, performing a climate assessment operation that assesses whether to allow vehicle access within a set of geofenced areas overlying the geographic region. The technique further involves, based on a result of the climate assessment operation, providing an access control signal which controls vehicle access to the set of geofenced areas overlying the geographic region.

19 Claims, 7 Drawing Sheets

(56) References Cited

U.S. PATENT DOCUMENTS

| | | |
|---|---|---|
| 11,048,255 B2 | 6/2021 | Lee et al. |
| 11,150,378 B2 * | 10/2021 | Root ..................... G06Q 30/02 |
| 11,395,951 B2 | 7/2022 | Doherty et al. |
| 11,707,657 B2 | 7/2023 | Hsu |
| 2002/0143729 A1 | 10/2002 | Fostick |
| 2004/0080430 A1 | 4/2004 | Videtich |
| 2011/0054776 A1 | 3/2011 | Petrov et al. |
| 2011/0307168 A1 | 12/2011 | Kieff |
| 2012/0139755 A1 | 6/2012 | Ginsberg |
| 2012/0232785 A1 | 9/2012 | Wiesemann et al. |
| 2014/0206394 A1 | 7/2014 | Root et al. |
| 2016/0247330 A1 | 8/2016 | Rork et al. |
| 2016/0328749 A1 | 11/2016 | Root et al. |
| 2018/0164119 A1 * | 6/2018 | Becker ................ B60W 60/001 |
| 2020/0051198 A1 * | 2/2020 | Rodriguez ......... G06Q 30/0283 |
| 2020/0190758 A1 | 6/2020 | Albers |
| 2020/0258089 A1 * | 8/2020 | Rodriguez ............. G08G 1/148 |
| 2021/0188219 A1 * | 6/2021 | Yamamoto .............. G01S 7/497 |
| 2022/0005210 A1 * | 1/2022 | Raveendran ....... B60H 1/00742 |

FOREIGN PATENT DOCUMENTS

| | | | | |
|---|---|---|---|---|
| AU | 2014213550 A1 | | 9/2014 | |
| AU | 2018203797 A1 | | 6/2018 | |
| CN | 112224089 A | * | 1/2021 | .......... B60L 15/2045 |
| EP | 2135036 | | 12/2009 | |
| EP | 3865819 | | 8/2021 | |
| JP | H0648008 U | | 6/1994 | |
| JP | 2003180902 A | | 7/2003 | |
| JP | 2015079411 A | * | 4/2015 | |
| KR | 100467726 B1 | | 1/2005 | |
| KR | 100873568 B1 | | 8/2007 | |
| KR | 100902943 B1 | | 12/2008 | |
| KR | 20160047916 A | | 5/2016 | |
| KR | 20160047918 A | | 5/2016 | |
| KR | 101753808 B1 | | 5/2017 | |
| KR | 20180007360 A | | 1/2018 | |
| KR | 101850254 B1 | | 4/2018 | |
| KR | 20190021780 A | | 3/2019 | |
| KR | 102304404 B1 | | 5/2021 | |
| KR | 20210071020 A | | 2/2022 | |

* cited by examiner

MANAGING VEHICLE ACCESS WITHIN GEOGRAPHIC REGIONS BASED ON CLIMATE INPUT SIGNALS

BACKGROUND

A golf cart may be equipped with a global positioning system (GPS) restricting device which prevents the golf cart from driving into or within certain restricted locations on a golf course such as putting greens, ponds, fairway locations around putting greens, etc. The GPS restricting device may even be configured to restrict the golf cart to cart path areas only (unless there is a severe weather emergency that disables the restricting operation of the GPS restricting device to enable golf cart passengers to immediately seek shelter).

During operation, the GPS restricting device compares a current GPS coordinate of the GPS restricting device, and thus of the golf cart, to a group of restricted GPS coordinates corresponding to the restricted locations on the golf course. If the current GPS coordinate of the golf cart is among the group of restricted GPS coordinates, the GPS restricting device prevents the golf cart from being driven further thus protecting the restricted locations on the golf course against damage.

SUMMARY

It should be understood that there are deficiencies to the above-described conventional approach to protecting restricted locations on golf courses against damage using global positioning system (GPS) restricting devices. Along these lines, the above-described conventional approach does not enable the GPS restricting devices to automatically impose access rules such as "cart path area only" restrictions based on climate factors (e.g., current surface conditions such as morning ground frost or soggy fairways, incoming spot showers, forecasted heavy rain, combinations thereof, and so on).

Rather, to restrict golf carts from certain locations on a golf course based on climate factors using the above-described conventional approach, the golf course would need to rely on a human operator (e.g., a skilled grounds keeper of the maintenance department) who continuously reviews weather information such as whether there is ground frost due to a previous cold night or soggy fairways due to recent rains, whether passing showers are approaching, whether rain will be heavy, and so on. The human operator would then apply certain decision making factors (e.g., experience, judgment, intuition, etc.) to determine when to direct the GPS restricting devices to restrict golf cart access on the golf course.

Once the human operator decides to restrict access (e.g., "to cart path areas only"), the human operator must then enter commands into a computerized interface that manages the GPS restricting devices in order to restrict vehicle access to each location one by one. Moreover, once the grounds keeper decides to no longer impose the vehicle restriction, the grounds keeper must undo the restriction. That is, the grounds keeper must then enter commands into the computerized interface to allow vehicle access to each location one by one.

Improved techniques are directed to managing vehicle access within geographic regions based on climate input signals. Such techniques involve control circuitry performing climate assessment operations based on the climate input signals to determine whether to allow vehicle access within geofenced areas overlying the geographic regions. In some arrangements, the control circuitry toggles vehicle access within geofenced areas based on input from national weather services, local weather stations, real time input from sensors installed within the geofenced areas, combinations thereof, etc. With such integration of climate input with geofencing technology, the control circuitry is able to permit (or allow) vehicle access to the geofenced areas under certain weather conditions (e.g., good weather) and subsequently restrict vehicle access to the geofenced areas under other weather conditions (e.g., frost, soggy ground conditions, etc.) to protect the geofenced areas from damage.

One embodiment is directed to a method of managing vehicle access within a geographic region. The method includes receiving a set of climate input signals that defines climate for the geographic region. The method further includes, based on the set of climate input signals, performing a climate assessment operation that assesses whether to allow vehicle access within a set of geofenced areas overlying the geographic region. The method further includes, based on a result of the climate assessment operation, providing an access control signal which controls vehicle access to the set of geofenced areas overlying the geographic region.

Another embodiment is directed to electronic equipment to manage vehicle access within a geographic region. The electronic equipment includes a set of interfaces, memory which stores a set of instructions, and processing circuitry coupled with the set of interfaces and the memory. The processing circuitry is constructed and arranged to, when operating in accordance with the set of instructions stored in the memory, perform a method of:

(A) receiving, through the set of interfaces, a set of climate input signals that defines climate for the geographic region, (B) based on the set of climate input signals, performing a climate assessment operation that assesses whether to allow vehicle access within a set of geofenced areas overlying the geographic region, and (C) based on a result of the climate assessment operation, providing an access control signal which controls vehicle access to the set of geofenced areas overlying the geographic region.

Yet another embodiment is directed to a computer program product having a non-transitory computer readable medium which stores a set of instructions to managing vehicle access within a geographic region. The set of instructions, when carried out by computerized circuitry, causes the computerized circuitry to perform a method of:

(A) receiving a set of climate input signals that defines climate for the geographic region;

(B) based on the set of climate input signals, performing a climate assessment operation that assesses whether to allow vehicle access within a set of geofenced areas overlying the geographic region; and (C) based on a result of the climate assessment operation, providing an access control signal which controls vehicle access to the set of geofenced areas overlying the geographic region.

In some arrangements, the set of geofenced areas covers a set of golfing locations on a golf course. Additionally, providing the access control signal includes outputting, as the control signal, a cart path only signal indicating whether passenger carrying golf carts are permitted within the set of geofenced areas.

In some arrangements, the set of climate input signals is received from a remote cloud server operated by a third party service that is separate from an entity operating the golf course, the set of climate input signals providing a local weather forecast for the geographic area. Additionally, performing the climate assessment operation includes generating the result of the climate assessment operation based on the local weather forecast upon receipt of the set of climate input signals from the remote cloud server.

In some arrangements, the set of climate input signals is received from a local radar-based weather service that is separate from an entity operating the golf course, the set of climate input signals providing real-time radar-based weather data for the geographic area. Additionally, performing the climate assessment operation includes generating the result of the climate assessment operation based on the real-time radar-based weather data upon receipt of the set of climate input signals from the local radar-based weather service.

In some arrangements, the set of climate input signals identifies a set of measurements obtained from a set of environmental sensors installed on the golf course. Additionally, performing the climate assessment operation includes generating the result of the access assessment operation based on the set of measurements obtained from the set of environmental sensors installed on the golf course.

In some arrangements, the result of the climate assessment operation indicates wet weather. Additionally, outputting the cart path only signal includes providing a cart path only command that prevents passenger carrying golf carts from driving within the set of geofenced areas to protect the golf course in response to the result of the climate assessment operation indicating wet weather.

In some arrangements, the method further includes:
(i) after providing the cart path only command that prevents passenger carrying golf carts from driving within the set of geofenced areas to protect the golf course, receiving a new set of climate input signals that defines new climate for the geographic region;
(ii) based on the new set of climate input signals, performing another climate assessment operation that provides a new result indicating drier weather; and
(iii) providing another cart path only command that permits passenger carrying golf carts to drive within the set of geofenced areas to allow normal golf cart use within the set of geofenced areas in response to the new result indicating wet weather.

In some arrangements, the method further includes:
(i) after providing the cart path only command that prevents passenger carrying golf carts from driving within the set of geofenced areas to protect the golf course, receiving a new set of climate input signals that defines new climate for the geographic region;
(ii) based on the new set of climate input signals, performing another climate assessment operation that provides a new result indicating an imminent weather emergency condition; and
(iii) providing another cart path only command that permits passenger carrying golf carts to drive within the set of geofenced areas to enable quick escape from the golf course in response to the new result indicating the imminent weather emergency condition.

In some arrangements, the result of the climate assessment operation indicates ground frost conditions. Additionally, outputting the cart path only signal includes providing a cart path only command that prevents passenger carrying golf carts from driving within the set of geofenced areas to protect the golf course in response to the result of the climate assessment operation indicating ground frost conditions.

In some arrangements, the set of climate input signals defines a set of weather conditions that applies to the golf course over a period of time. Additionally, performing the climate assessment operation includes applying a set of rules to the set of weather conditions defined by the set of climate input signals to generate the result of the climate assessment operation.

In some arrangements, the method further includes:
(i) prior to applying the set of rules, presenting a user interface to a golf course operator;
(ii) receiving, from the golf course operator through the user interface, a set of weather criteria for prohibiting passenger carrying golf carts from driving within the set of geofenced areas; and
(iii) establishing the set of rules from the set of weather criteria.

In some arrangements, the method further includes:
(i) prior to applying the set of rules, presenting a user interface to a golf course operator;
(ii) receiving, from the golf course operator through the user interface, a set of weather criteria for allowing passenger carrying golf carts to drive within the set of geofenced areas; and
(iii) establishing the set of rules from the set of weather criteria.

In some arrangements, outputting the cart path only signal indicating whether passenger carrying golf carts are permitted within the set of geofenced areas includes wirelessly transmitting the cart path only signal to a fleet of passenger carrying golf carts equipped to selectively operate within the geographic region (i) in only non-geofenced areas or (ii) in both the non-geofenced areas and the set of geofenced areas based on the cart path only signal.

In some arrangements, the method further includes wirelessly receiving golf cart location signals from the fleet of passenger carrying golf carts to confirm whether the fleet of passenger carrying golf carts is selectively operating within the geographic region (i) in only non-geofenced areas or (ii) in both the non-geofenced areas and the set of geofenced areas.

In some arrangements, performing the climate assessment operation includes generating the result of the climate assessment operation based on (i) a local weather forecast from a remote cloud server, (ii) real-time radar-based weather data from a local radar-based weather service, and (iii) a set of measurements obtained from a set of environmental sensors installed on the golf course.

Other embodiments are directed to systems, vehicles/craft, apparatus, assemblies, computer program products, and so on. Some embodiments are directed to various methods, platforms, subsystems, and componentry which are involved in managing vehicle access within geographic regions based on climate input signals.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

An improved technique is directed to managing vehicle access within a geographic region based on a set of climate input signals. Such a technique involves control circuitry performing a climate assessment operation based on the set of climate input signals to determine whether to allow vehicle access within a set of geofenced areas overlying the geographic region. In some arrangements, the control circuitry toggles vehicle access within the set of geofenced areas based on input from national weather services, local weather stations, real time input from sensors installed within the geographic region, combinations thereof, etc. With such integration of climate input with geofencing technology, the control circuitry is able to permit (or allow) vehicle access to the set of geofenced areas under certain weather conditions (e.g., good weather) and subsequently restrict vehicle access to the set of geofenced areas under other weather conditions (e.g., frost, soggy ground conditions, etc.) to protect the set of geofenced areas from damage.

The various individual features of the particular arrangements, configurations, and embodiments disclosed herein can be combined in any desired manner that makes technological sense. Additionally, such features are hereby combined in this manner to form all possible combinations, variants and permutations except to the extent that such combinations, variants and/or permutations have been expressly excluded or are impractical. Support for such combinations, variants and permutations is considered to exist in this document.

Figure 1:
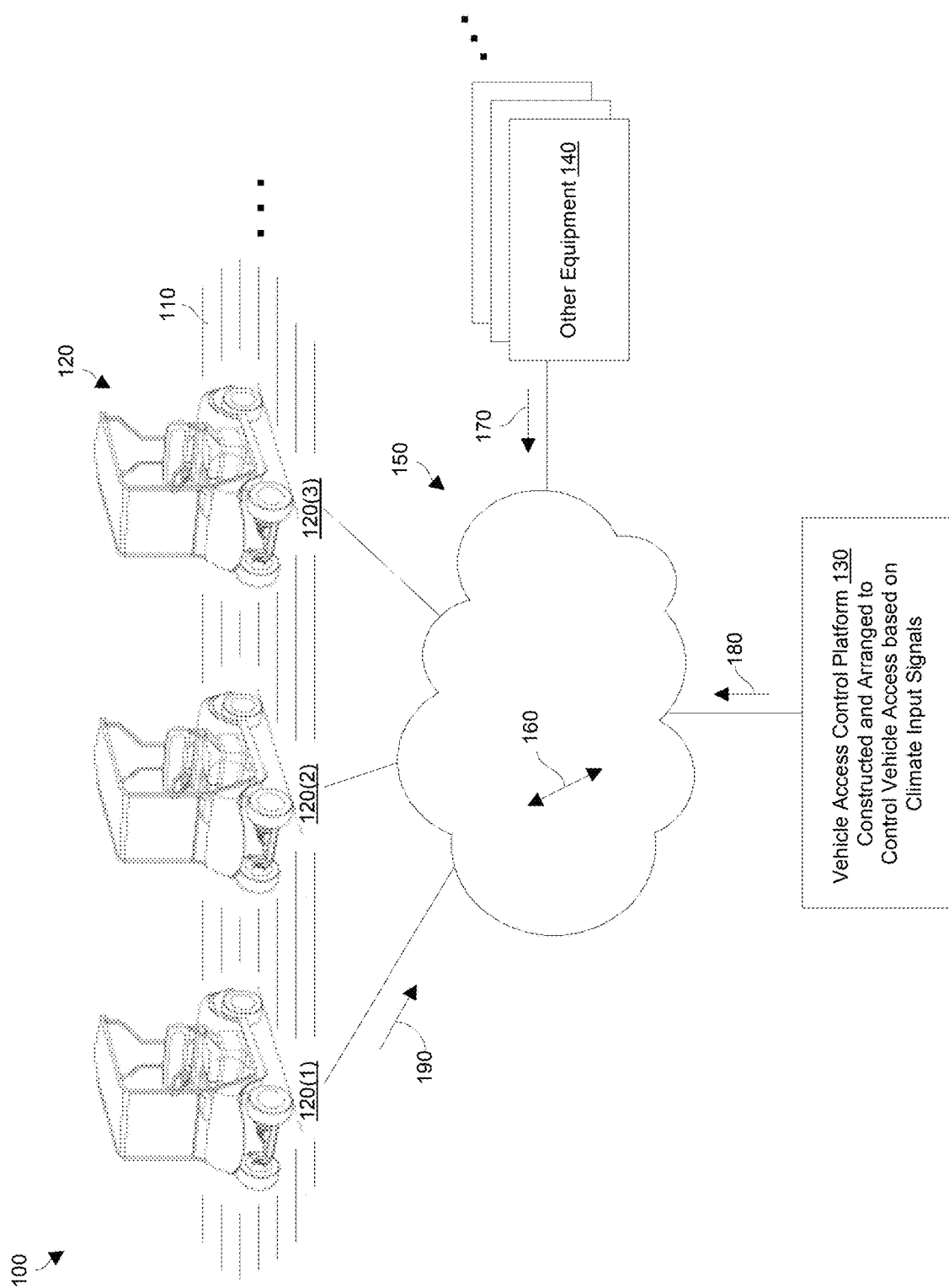
FIG. 1 is a view of an environment in which vehicle access is managed based on climate input signals in accordance with certain embodiments.

FIG. 1 shows an environment 100 in which vehicle access is managed within a geographic region 110 based on climate input signals in accordance with certain embodiments. The environment 100 includes vehicles 120(1), 120(2), 120(3), . . . (collectively, vehicles 120), a vehicle access control platform 130, other equipment 140, and communication media 150.

The vehicles 120 are constructed and arranged to perform useful work. Along these lines, a particular vehicle 120 may carry one or more passengers and may perform additional tasks such as transport cargo, provide refrigeration, communicate information to one or more remote devices, navigate difficult terrain, combinations thereof, etc. As will be explained in further detail shortly, the vehicles 120 are equipped with propulsion control mechanisms which can be used to allow/prevent the vehicles 120 from driving into and/or within certain geographical areas of the geographic region 110 based on control signals from the vehicle access control platform 130.

The vehicle access control platform 130 is constructed and arranged to provide the control signals to the vehicles 120 based on climate information. Along these lines, the vehicle access control platform 130 may receive climate signals from various sources of climate information such as a national weather service, a local weather station, sensors installed within the geographic region 110, combinations thereof, etc. The vehicle access control platform 130 then makes determinations on whether to permit the vehicles 120 within the geographical areas of the geographic region 110 based on the climate information, and accordingly provides the control signals to the vehicles 120 in accordance with the determinations.

In some arrangements, at least some of the vehicle access control platform 130 is on-site (e.g., in the context of a golf course, at least a portion of the vehicle access control platform 130 may take the form of a server at the clubhouse or at the shed that maintains the vehicles 120). In some arrangements, at least some of the vehicle access control platform 130 is remote (e.g., in the context of a golf course, at least a portion of the vehicle access control platform 130 may reside in a remote server or in the cloud to be accessed as a service via a portal).

The other equipment 140 is constructed and arranged to represent other components of the environment 100. Examples of such components include cloud equipment (e.g., for a national weather service), local equipment (e.g., local radar operated by a local weather station), on-site equipment (e.g., sensors installed within or in the vicinity of the set of geofenced areas).

The communications media 150 is constructed and arranged to connect the various components of the environment 100 together to enable these components to exchange electronic signals 50 (e.g., see the double arrow 160). At least a portion of the communications medium 26 is illustrated as a cloud to indicate that the communications medium 150 is capable of having a variety of different topologies including backbone, hub-and-spoke, loop, irregular, combinations thereof, and so on. Along these lines, the communications medium 150 may include wireless devices, copper-based data communications devices and cabling, fiber optic devices and cabling, combinations thereof, etc. Furthermore, the communications medium 150 is capable of supporting LAN-based communications, SAN-based communications, cellular communications, WAN-based communications, distributed infrastructure communications, other topologies, combinations thereof, etc.

During operation, the vehicle access control platform 130 is able to manage vehicle access within the geographic region 110. Along these lines and as will be explained in further detail shortly, the geographic region 110 may be configured with a set of geofenced areas (e.g., one or more geofenced areas overlying the geographic region 110). The vehicle access control platform 130 then communicates with the vehicles 120 to permit the vehicles 120 to drive within the set of geofenced areas, or to prohibit the vehicles 120 from driving within the set of geofenced areas.

In accordance with certain embodiments, such management of vehicle access by the vehicle access control platform 130 may be based on set of climate input signals 170 (e.g., from the other equipment 140) that defines climate for the geographic region 110. Climate factors include current and predicted temperature for the geographic region 110, current and predicted ground wetness conditions for the geographic region 110, current and predicted humidity for the geographic region 110, and so on. Accordingly, the vehicle access control platform 130 is able to determine whether it is unsafe to allow the vehicles 120 to drive driving within the set of geofenced areas (e.g., whether there is high risk of damaging the ground conditions), or whether it is safe to allow the vehicles 120 to drive driving within the set of geofenced areas (e.g., whether there is little risk of damaging the ground conditions).

After the vehicle access control platform 130 has made the decision on whether to permit or prohibit vehicle access to the set of geographic areas of the geographic region 110, the vehicle access control platform 130 provides a set of control signals 180 to the vehicles 120. In some embodiments, the set of control signals 180 simply toggles the vehicles 120 from operating in a normal mode that allows the vehicle 120 to drive within the set of geofenced areas as well as outside the set of geofenced areas, to operating in a restricted mode in which the vehicles 120 are not allowed to drive within the set of geofenced areas but are still permitted to drive outside the set of geofenced areas. In other arrangements, the set of control signals 180 individually enable/disable certain vehicle driving capabilities of the vehicles 120 based monitoring current locations of the vehicles 120 and such decisions are made by the vehicle access control platform 130.

In some arrangements, the vehicles 120 routinely provide vehicle signals 190 to the vehicle access control platform 130. Such vehicle signals 190 may identify respective locations to the vehicle 120, current vehicle status, local climate status, messages from vehicle operators, combinations thereof, and so on. Further details will now be provided with reference to FIG. 2.

Figure 2:
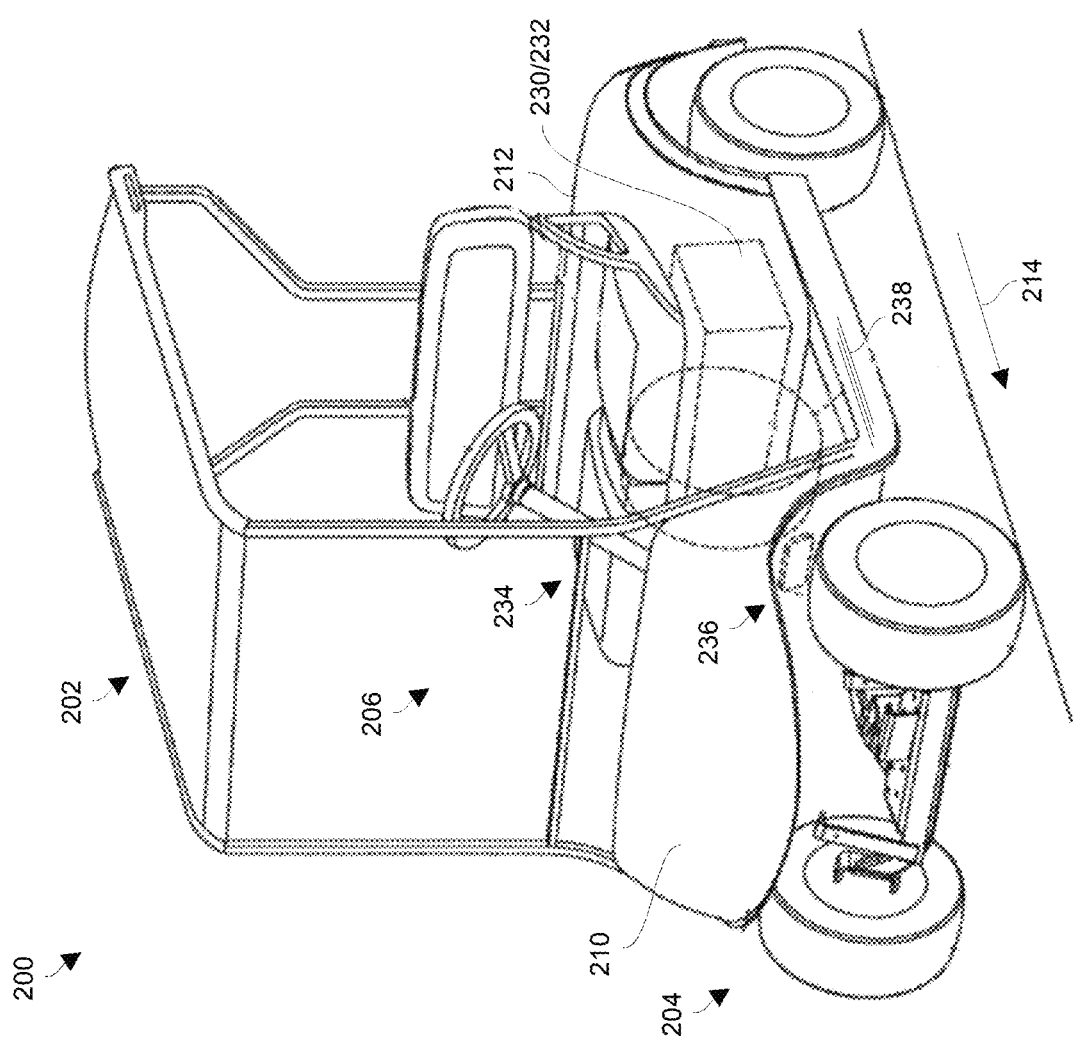
FIG. 2 is a view of a vehicle in accordance with certain embodiments.

FIG. 2 is a diagram of an example utility vehicle 200, which is suitable for use as a vehicle 120 which, based on the set of climate input signals 170, is managed by the vehicle access control platform 130 in accordance with certain embodiments. The utility vehicle 200 includes a utility vehicle body 202 (e.g., a chassis, a frame, etc.), a set of ground engagement members 204 (e.g., a set of tires), and a motion control system 206. It should be understood that the utility vehicle 200 has the form factor of a golf car by way of example only and that other utility vehicle form factors are suitable for use as well such as those of personnel and/or cargo transport vehicles, food and beverage vehicles, hospitality vehicles, all-terrain vehicles (ATVs), utility task vehicles (UTVs), tracked vehicles, larger specialized equipment and/or application vehicles, motorcycles, scooters, as well as other lightweight and/or special purpose vehicles.

The utility vehicle body 202 defines a vehicle front 210 and a vehicle back 212. Accordingly, when the utility vehicle 200 moves forward, the utility vehicle 200 is considered to move in a front-to-back direction (see arrow 214).

The set of ground engagement members 204 is constructed and arranged to interact with the environment to move the utility vehicle 200 (e.g., see the geographic region 110 in FIG. 1). It should be understood that various types of engagement members 204 are suitable for use (e.g., tires/wheels, tracks, rails, combinations thereof, etc.) depending on the type of environment or terrain (e.g., a road, dirt, brush, snow, ice, marsh, etc.).

The motion control system 206 is constructed and arranged to control vehicle movement such as drive provided by the set of engagement members 204, speed control, braking, and so on thus enabling the utility vehicle 200 to effectively maneuver and perform useful work. The motion control system 206 may include, among other things, a motor system 230, a battery management system 232, and additional components 234 such as a set of user controls 236 (e.g., foot pedals, transmission control, a keyed switch, a maintenance switch, additional levers/knobs/etc.), cabling 238, and so on.

It should be understood that certain components of the motor control system 206 (or portions thereof) may be disposed within a set of compartments (in one or more compartments) under a set of seats (under one or more seats) of the utility vehicle 200. For example, a compartment underneath a seat of the utility vehicle 200 may house one or more rechargeable batteries, control circuitry, cabling, controls, etc. for ease of access/serviceability, to protect passengers, for protection against damage, for security, and so on. Other locations are suitable for use as well such as under a hood, under a rear bed, etc.

It should be further understood that the motion control system 206 includes other apparatus/components as well. Along these lines, the motion control system 206 further includes a drivetrain (e.g., a set of gears, linkage, differential, etc.) that connects the motor system 230 to the set of engagement members 204 (e.g., two drive wheels and two non-drive wheels), a steering wheel (or column), a steering gear set that connects the steering wheel to certain engagement members 204, a set of brakes, other controls and sensors, and so on.

As will be explained in further detail shortly, the utility vehicle 200 includes an electric traction motor which runs on electric power from a rechargeable battery for propulsion, and which provides regenerative braking to recharge the rechargeable battery. Moreover, the utility vehicle 200 is configured to control whether the operator is able to drive within a geofenced area based on control from the vehicle access control platform 130 and the current location of the utility vehicle 200.

For example, suppose that the geographic region 110 is a golf course, and that the utility vehicle 200 is a golf cart that carries one or more passengers and golfing equipment around the golf course during a round of golf. In this example, the vehicle access control platform 130 may decide to restrict golf cart access to cart paths only in order to protect certain golf course locations such as fairways, roughs, other golfing locations, etc. from damage that would otherwise occur if the golf carts were permitted to drive in these locations. Along these lines, there currently could be frost or wet ground conditions, etc. (or such conditions could be imminent based on forecasts) making the golf course vulnerable to damage. The vehicle access control platform 130 may thus make this decision based on a variety of climate factors from a variety of climate data sources (e.g., current soil wetness, humidity, weather forecasts, cloud/sun conditions, combinations thereof, etc.), and then provide a set of control signals to impose the restriction on the golf cart. In some arrangements, the restricted locations are defined by one or more geofences, and the set of control signals prevents the golf cart from entering and driving within the one or more geofences.

Later, as the conditions improve, the vehicle access control platform 130 may make another decision (or update the decision) indicating that damage to the golf course is no longer likely based on a variety of new (or updated) climate factors. In this situation, the vehicle access control platform 130 provide a new (or updated) set of control signals to the golf cart to remove the restriction. Accordingly, the golf cart is now permitted to drive on both the cart paths as well as the earlier-restricted locations. Further details will now be provided with reference to FIG. 3.

Figure 3:
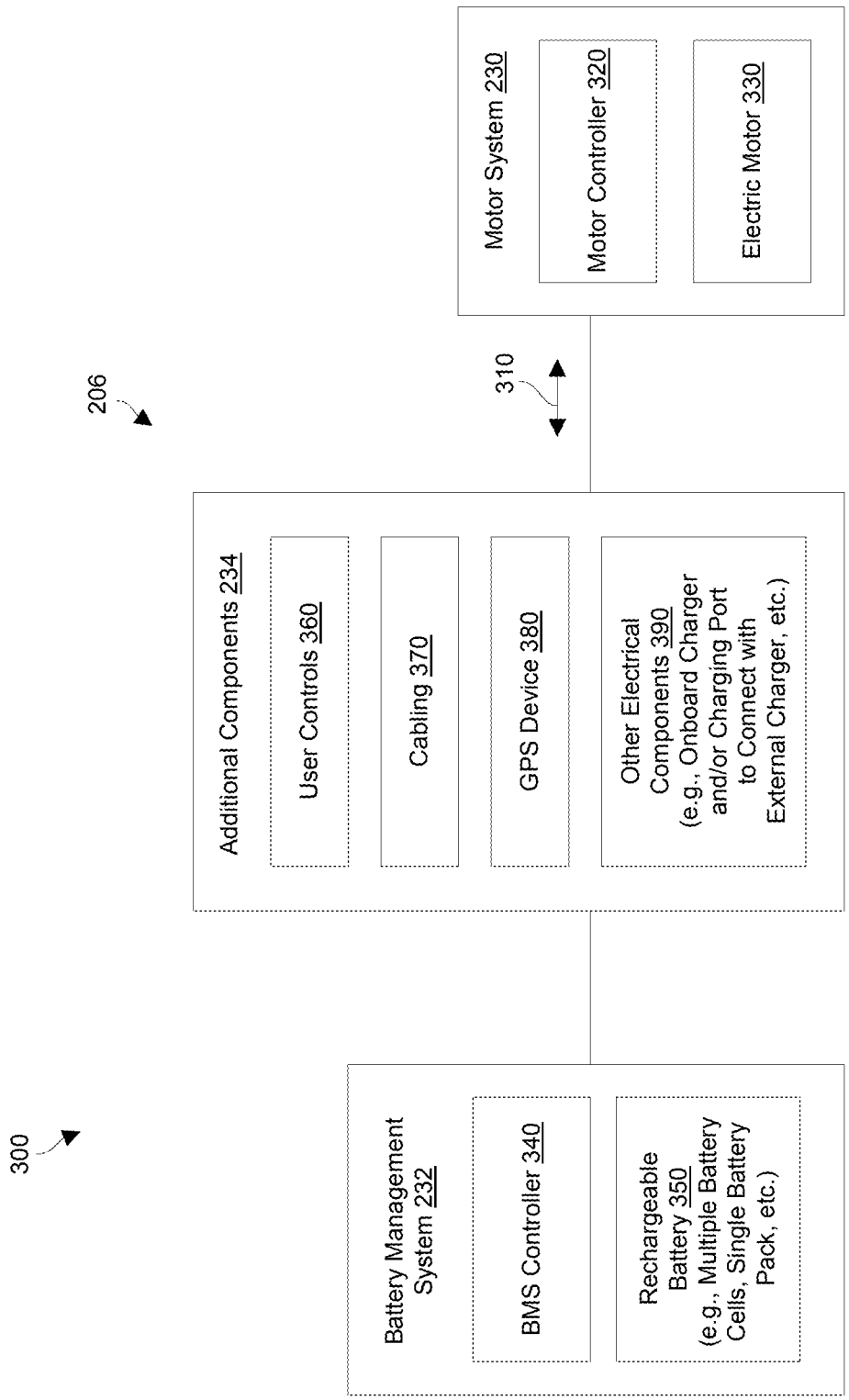
FIG. 3 is a block diagram of certain vehicle componentry in accordance with certain embodiments.

FIG. 3 is a view 300 of at least a portion of the motion control system 206 of the utility vehicle 200 (also see FIG.

2) in accordance with certain embodiments. As shown in FIG. 3, the motor system 230, the battery management system (BMS) 232, and the additional components 234 are coupled with each other (e.g., via power buses, communications buses, etc.) and exchange electrical signals 310 (e.g., power signals, control/status signals, sensor signals, and so on). The motor system 230 includes a motor controller 320 and an electric traction motor 330 (or simply electric motor 330) coupled with the motor controller 320. The BMS 232 includes a BMS controller 340 and a rechargeable battery (or rechargeable traction power source) 350 coupled with the BMS controller 340. The additional components 234 refer to various componentry coupled with the motor system 230 and/or the battery management system 232 such as user controls 360 (e.g., switches, pedals, etc.), cabling 370 (e.g., power cables, communications buses, etc.), a GPS device (or circuit) 380, and various other components 390 (e.g., an onboard charger and/or a charging receptacle to connect with an external charger, lights, one or more inertial measurement units, specialized equipment, other loads, etc.). In some arrangements, various components of the motion control system 206 communicate through a controller area network (CAN) bus via electronic CAN messages in accordance with the CAN protocol.

The motor controller 320 of the motor system 230 is constructed and arranged to control delivery of stored electric energy from the BMS 232 to the electric motor 330 which ultimately operates at least some of the engagement members 204 to move the utility vehicle 200 (FIG. 2). Additionally, in some arrangements, the motor controller 320 operates the electric motor 330 to provide regenerative braking in which the electric motor 330 converts kinetic energy of the moving utility vehicle 200 into electrical energy to recharge the rechargeable battery 350 (e.g., during braking, while coasting downhill, during accelerator pedal release, etc.). To this end, the motor controller 320 and/or the additional components 234 may be provisioned with a battery system interface that enables the motor controller 320 to robustly and reliably connect with and communicate with the BMS 232.

In accordance with certain embodiments, the various other components 390 of the motion control system 206 enable recharging of the rechargeable battery 350. The charger may be onboard or externally coupled to the utility vehicle 200 through a charging port (e.g., when the utility vehicle 200 is parked and connected to an external charger at a charging station).

Additionally, in accordance with certain embodiments, the GPS device 380 is constructed and arranged to monitor the current location of the utility vehicle 200 and, if the utility vehicle 200 is within a geofenced area, perform a particular operation such as disabling further driving, lowering the speed limit, outputting an alarm, sending a message to a central server (e.g., see the vehicle access control platform 130 in FIG. 1), combinations thereof, etc. In some arrangements, the GPS device 380 may slow the utility vehicle 200 and/or alert vehicle passengers when the GPS device 380 detects that the utility vehicle 200 is within a predefined distance of a geofenced area (e.g., a few feet, a few yards, etc.). Further details will now be provided with reference to FIG. 4.

Figure 4:
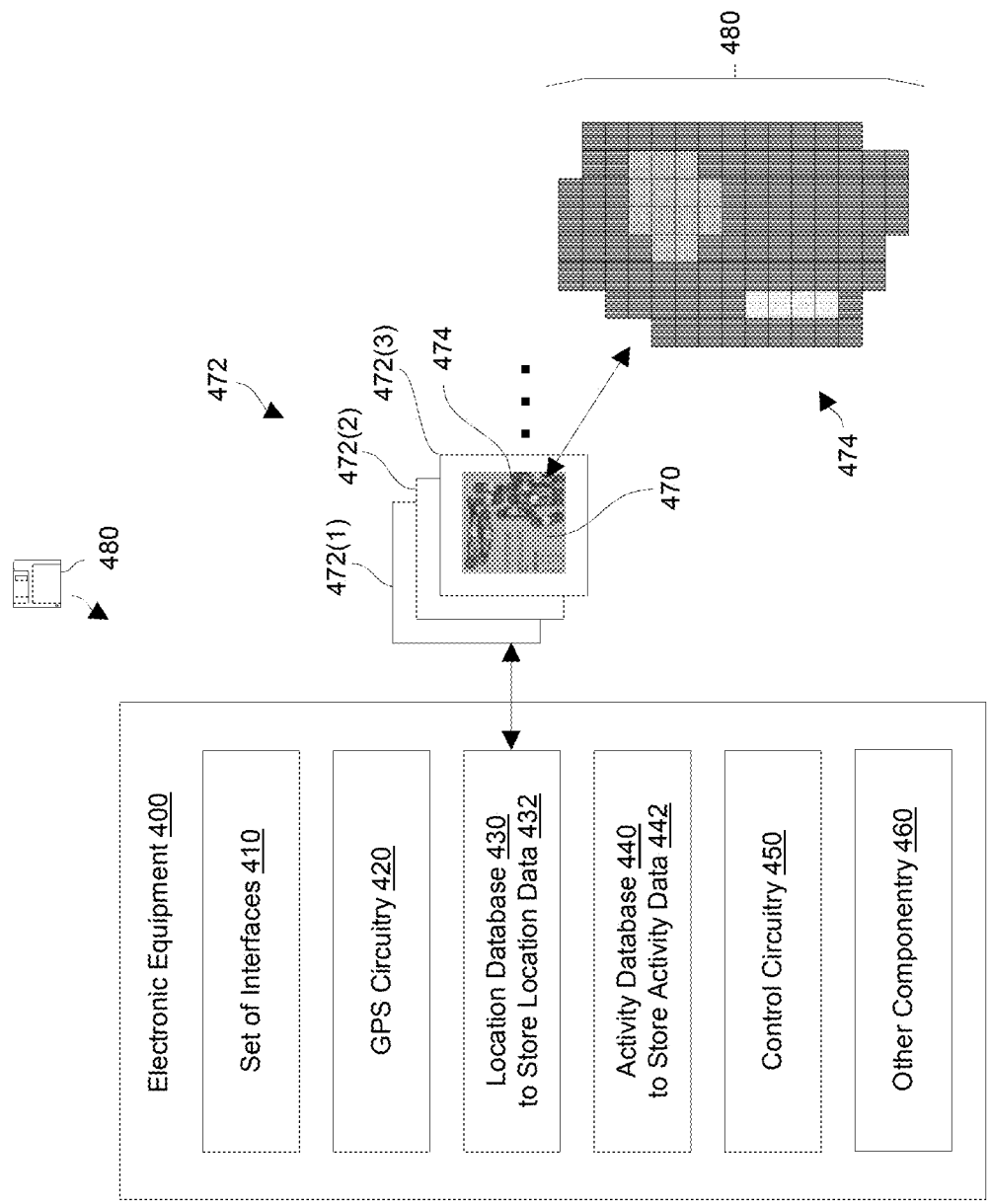
FIG. 4 is a block diagram of certain electronic equipment for the vehicle in accordance with certain embodiments.

FIG. 4 shows, in accordance with certain embodiments, electronic equipment 400 which is suitable for use as the GPS device (or circuit) 380 (also see FIG. 3). As shown in FIG. 4, the electronic equipment 400 includes a set of interfaces 410, GPS circuitry 420, a location database 430 to store location data 432, an activity database 440 to store activity data 442, control circuitry 450, and other componentry 460.

The set of interfaces 410 enables the electronic equipment 400 to communicate with other components of the motion control system 206 of the utility vehicle 200 (also see FIGS. 2 and 3). Along these lines, the set of interfaces 410 may include one or more network interfaces (e.g., a wireless transceiver, network card, etc.) to enable the electronic equipment 400 to communicate with other equipment/devices/etc. of the motion control system 206 (also see FIG. 2). Alternatively or additionally, the set of interfaces 410 may include other types of interfaces such as specialized or custom circuitry to interface with specialized equipment (e.g., a wireless interface to connect with an external base station or to provide cellular connectivity, a power port to connect with an external charger, connectors/terminals/etc. to connect with other vehicle componentry, a CAN bus interface, combinations thereof, etc.).

The GPS circuitry 420 is constructed and arrange to identify a current GPS location (e.g., GPS coordinates) of the electronic equipment 400. Accordingly, when the electronic equipment 400 is installed as part of the motion control system 206 of the utility vehicle 200, the GPS circuitry 420 is able to identify the current GPS location of the utility vehicle 200.

The location database 430 is constructed and arranged to store location data 432 for one or more geographic regions 470 (also see the geographic region 110 in FIG. 1) traversable by the utility vehicle 200 (e.g., a golf course, a campus, a gated community or village, lawns, other mapped regions, combinations thereof, etc.). Along these lines, the location data 432 may include a set of geofencing entries 472(a), 472(b), 472(c), . . . (collectively, geofencing entries 472). The geofencing entries 472 define respective geofences 474, i.e., geographic areas within the geographic regions 470 which are defined by virtual boundaries or perimeters within and within which the utility vehicle 200 may reside from time to time.

The activity database 340 is constructed and arranged to store activities data 442 defining activities for the geofencing entries 472 defining the geofences 474. Such activities data 442 may include preventing the utility vehicle 200 from driving above a certain speed while the utility vehicle 200 is within the climate restricted type geofence 374, preventing the utility vehicle 200 from driving forward while the utility vehicle 200 is within the climate restricted type geofence 474, preventing the utility vehicle 200 from driving altogether while the utility vehicle 200 is within the climate restricted type geofence 474, outputting an alarm while the utility vehicle 200 is within the climate restricted type geofence 474, etc.

In some arrangements, there is a correspondence or mapping between certain geofencing entries 472 and lists of activities defined by the activity data 442. For example, for a geofencing entry 472 that identifies a fairway of a golf course hole, suppose that the electronic equipment 400 receives a "cart path only" command from the corresponding the vehicle access control platform 130 (FIG. 1). In such a situation, when the electronic equipment 400 is about to enter or is within a geofence defined by a geofencing entry 472, the electronic equipment 400 is able to determine a set of activities to perform from a list of activities corresponding to the geofencing entry 472 (e.g., lower the speed limit, disable forward driving, output an alert, combinations thereof, etc.).

The control circuitry 350 of the electronic equipment 300 is constructed and arranged to restrict operation of the utility vehicle 200 to certain activities defined by the activity data 442 when the utility vehicle 200 is within restricted mode (e.g., as commanded by the vehicle access control platform 130, also see FIG. 1) and the control circuitry determines that the utility vehicle 200 is currently within a geofenced area 474. Such operation may include communicating with the motor controller 320 of the motor system 130 (also see FIG. 3) to control operation of the electric motor 330 (e.g., override a default speed limit, disable forward movement, etc.).

It should be appreciated that the control circuitry 450 may be implemented in a variety of ways such as via one or more processors (or cores) running specialized software stored in non-volatile memory, application specific ICs (ASICs), field programmable gate arrays (FPGAs) and associated programs, discrete components, analog circuits, other hardware circuitry, combinations thereof, and so on. In the context of one or more processors (and/or other types of computerized circuitry) executing software, a computer program product 480 is capable of delivering all or portions of the specialized software to the electronic equipment 400. In particular, the computer program product 480 includes a non-transitory (or non-volatile) computer readable medium which stores a set of instructions that controls one or more operations of the electronic equipment 400. Examples of suitable computer readable storage media include tangible articles of manufacture and apparatus which store instructions in a non-volatile manner such as DVD, CD-ROM, flash memory, disk memory, tape memory, combinations thereof, and the like.

The other componentry 460 of the electronic equipment 400 refers to additional features/components that may belong to the electronic equipment 400. Along these lines, the electronic equipment 400 may have a time clock, a local set of user input/output (I/O) devices (e.g., a touchscreen or similar display, a keyboard, a mouse, a microphone, LEDs, a speaker, etc.), and so on.

In some arrangements, the electronic equipment 400 is provided as a modular device which couples with the other components of the motion control system 206 (e.g., by connecting to a CAN bus of the utility vehicle 200). Accordingly, legacy utility vehicles may be conveniently upgraded without extensive modifications, redesigns, and so on.

In other arrangements, the electronic equipment 400 is more tightly integrated with the other components of the motion control system 206 (e.g., by sharing certain resources such as the same housing/enclosure and/or circuits as that of the motor controller 320, by residing on the same circuit board as other processing circuitry of the utility vehicle 200, etc.). Accordingly, new utility vehicles may share infrastructure to reduce/eliminate redundancy, waste, etc.

In some arrangements, the electronic equipment 400 is constructed and arranged to perform a variety of other operations. Such operations may include outputting alerts when the utility vehicle 200 is in a restricted or hazardous area, providing weather information, communicating with a base station, and so on. In the context of a specialized vehicle such as a golf cart, the electronic equipment 400 may display, based on current GPS locations, current golf holes, entire hole distances, distances from the utility vehicle 200 to the pins, pace of play, etc.

During operation, the electronic equipment 400 is able to toggle between a normal mode and a restricted mode when controlling a vehicle 120. When the electronic equipment 400 is in the normal mode, the electronic equipment 400 permits the vehicle 120 to access a set of geofenced areas 474 and other areas. When the electronic equipment 400 is in the restricted mode, the electronic equipment 400 does not permit the vehicle 120 to access the set of geofenced areas 474 but still allows the vehicle 120 to access the other areas.

It should be understood that in either mode, the electronic equipment 400 still determine current GPS location of the vehicle 120 for various reasons. For example, in the normal mode, the electronic equipment 400 may identify GPS locations of the vehicle 120 and update a log and/or wirelessly transmit the GPS locations to a central server for logging or monitoring. Additionally, in the restricted mode, the electronic equipment 400 may identify GPS locations of the vehicle 120 to determine whether to restrict vehicle access (e.g., by lowering the speed limit of the vehicle 120, by disabling the ability to drive forward, etc.).

As shown in the inset 480 in FIG. 4 and in accordance with certain embodiments, a geofenced area 474 is a geographic area defined by a virtual boundary or perimeter. For example, such a geofenced area 474 may be defined by a grid (or an array of cells/coordinates) of adjacent GPS locations. That is, the geofencing data 432 for the geofenced area 474 identifies GPS locations. Some GPS locations may be marked as belonging to the geofenced area 474, and other GPS locations may be marked as not belonging to the geofenced area 474.

In this example, the GPS circuitry 420 of the electronic equipment 400 identifies its current GPS location. When the electronic equipment 400 moves into a GPS location that is marked as belonging to the geofenced area 474, the control circuitry 450 of the electronic equipment 400 considers the electronic equipment 400 (and thus the vehicle 120 that the electronic equipment controls) as residing in (or having entered) the geofenced area 474. If the electronic equipment 400 moves into another GPS location that is marked as belonging to the geofenced area 474, the control circuitry 450 considers the electronic equipment 400 as still residing in the geofenced area 474. However, when the electronic equipment 400 moves out of that GPS location and into a GPS location that marked as not belonging to the geofenced area 474, the control circuitry 450 considers the electronic equipment 400 as no longer being in (or having exited) the geofenced area 474.

In other embodiments, the electronic equipment 400 communicates the current GPS location of the electronic equipment 400 to a remote device such as a base station or central server (e.g., see the vehicle access control platform 130 or other equipment 140 in FIG. 1). The remote device then determines whether the electronic equipment 400 (and thus the vehicle 120) resides within the geofenced area 474.

It should be understood that other geofencing technologies are suitable for use in place of the GPS circuitry. For example, in some embodiments, geofenced areas may be associated with RF readers, and the electronic equipment 400 includes RFID card technology that can be brought close to the RF readers to inform a remote device that the electronic equipment 400 (as well as the vehicle 120) are now entering geofenced areas 260. Other embodiment may involve combinations of geofencing technologies (e.g., GPS, Bluetooth beaconing, RF, etc.), and so on.

Additionally, it should be understood that the electronic equipment 400 may be configured to perform other operations and/or provide other restrictions for other types of geofences. For example, the electronic equipment 400 be configured to restrict vehicle access to certain other types of geofences regardless of climate input. Further details will now be provided with reference to FIG. 5.

Figure 5:
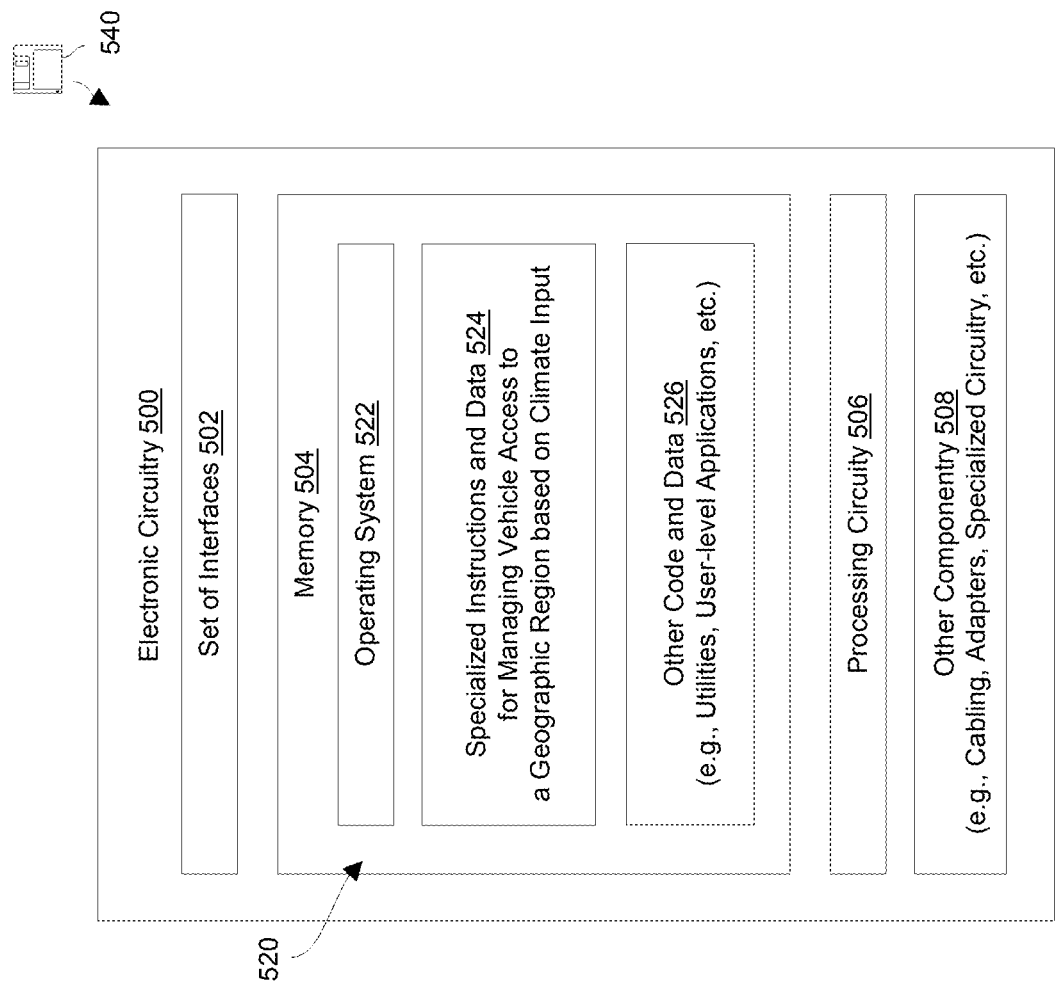
FIG. 5 is a block diagram of certain electronic circuitry for a vehicle access control platform in accordance with certain embodiments.

FIG. 5 is a block diagram of electronic circuitry 500 which is suitable for at least a portion of the vehicle access control platform 130 of the environment 100 (also see FIG. 1) in accordance with certain embodiments. The electronic circuitry 500 includes a set of interfaces 502, memory 504, processing circuitry 506, and other circuitry 508.

The set of interfaces 502 is constructed and arranged to connect the electronic circuitry 500 with other components to enable the electronic circuitry 500 to communicate with other components of the environment 100 such as vehicles 120 and the other equipment 140 (FIG. 1). Along these lines, the set of interfaces 502 may include one or more computer network interfaces, antenna for wireless communications, and so on to provide connectivity through the communications media 150 (FIG. 1).

The memory 504 is intended to represent both volatile storage (e.g., DRAM, SRAM, etc.) and non-volatile storage (e.g., flash memory, magnetic memory, etc.). The memory 504 stores a variety of software constructs 520 including an operating system 522, specialized instructions and data 524, and other code and data 526. The operating system 522 refers to particular control code such as a kernel to manage computerized resources (e.g., processor cycles, memory space, etc.), the I/O stack (e.g., drivers), and so on. The specialized instructions and data 524 refers to particular instructions for managing vehicle access to a geographic region based on climate input. The other code and data 526 refers to applications and routines to provide additional operations and services (e.g., for advertisement display, for receiving status from the vehicles 120, etc.), user-level applications, administrative tools, utilities, and so on.

The processing circuitry 506 is constructed and arranged to operate in accordance with the various software constructs 520 stored in the memory 504. As will be explained in further detail shortly, the processing circuitry 506 executes the operating system 522 and the specialized code 524 to form specialized circuitry that robustly and reliably manages vehicle access to a geographic region based on climate input. Such processing circuitry 506 may be implemented in a variety of ways including via one or more processors (or cores) running specialized software, application specific ICs (ASICs), field programmable gate arrays (FPGAs) and associated programs, discrete components, analog circuits, other hardware circuitry, combinations thereof, and so on. In the context of one or more processors executing software, a computer program product 540 is capable of delivering all or portions of the software constructs 520 to the electronic circuitry 500. In particular, the computer program product 540 has a non-transitory (or non-volatile) computer readable medium which stores a set of instructions that controls one or more operations of the electronic circuitry 500. Examples of suitable computer readable storage media include tangible articles of manufacture and apparatus which store instructions in a non-volatile manner such as DVD, CD-ROM, flash memory, disk memory, tape memory, and the like.

The other componentry 508 refers to other hardware of the electronic circuitry 500. Along these lines, the electronic circuitry 500 may further include cabling, adaptors, auxiliary apparatuses, power supplies, other specialized componentry, combinations thereof, etc.

As described above, the electronic circuitry 500 is suitable for at least a portion of the vehicle access control platform 130. In accordance with certain embodiments, one or more features or resources (e.g., the ability to manage vehicle access within a geographic region based on climate input) is provided by the electronic circuitry 500 as a set of subscription services which is accessible via respective portals. Such a set of subscription services may be enabled and/or disabled at any time (e.g., toggled on/off by a user and/or by a service provider after enrollment).

In the subscription service context, a user (e.g., an administrator operating a fleet of utility vehicles, an individual, etc.) may subscribe to the subscription service to access tools to create and/or modify custom geofences, to acquire predefined geofences, to setup and/or tune operating aspects and/or other geo-assessment factors, combinations thereof, etc.). Such parameters may be stored locally (e.g., within a local server) and/or remotely (e.g., at a central server, in the cloud, etc.).

Moreover, in some arrangements, tools of the subscription service may derive, offer and/or recommend certain parameter values, adjustments, etc. For example, the electronic equipment 500 may store a log of prior times in which vehicle access has been restricted based on climate input (also see the other code and data 526 in FIG. 5). The subscription service may then compute new rules or criteria for restricting vehicle access due to certain climate input, recommend different geofences, suggest and/or automatically deploy new geofences, etc. based on the data from the log.

In some embodiments, access to the subscription service may be made through a portal accessed by an operator of the vehicle access control platform 130 and/or by users of the vehicles 120. Moreover, the subscription service and/or certain vehicle parameters may further be accessible from one or more other devices (e.g., a general purpose computer, a smart phone, a tablet, other web-based devices, etc.) for enhanced accessibility.

In accordance with certain embodiments, the electronic equipment 400 on-board the vehicle 200 may provide the vehicle 200 with access to other subscription-based services. Along these lines, the electronic equipment 400 (and/or other equipment on the vehicle 120) may offer access to software based updates, diagnostics and similar tools, emergency services, navigation services, on-vehicle security and tracking services, and so on. Further details will now be provided with reference to FIG. 6.

Figure 6:
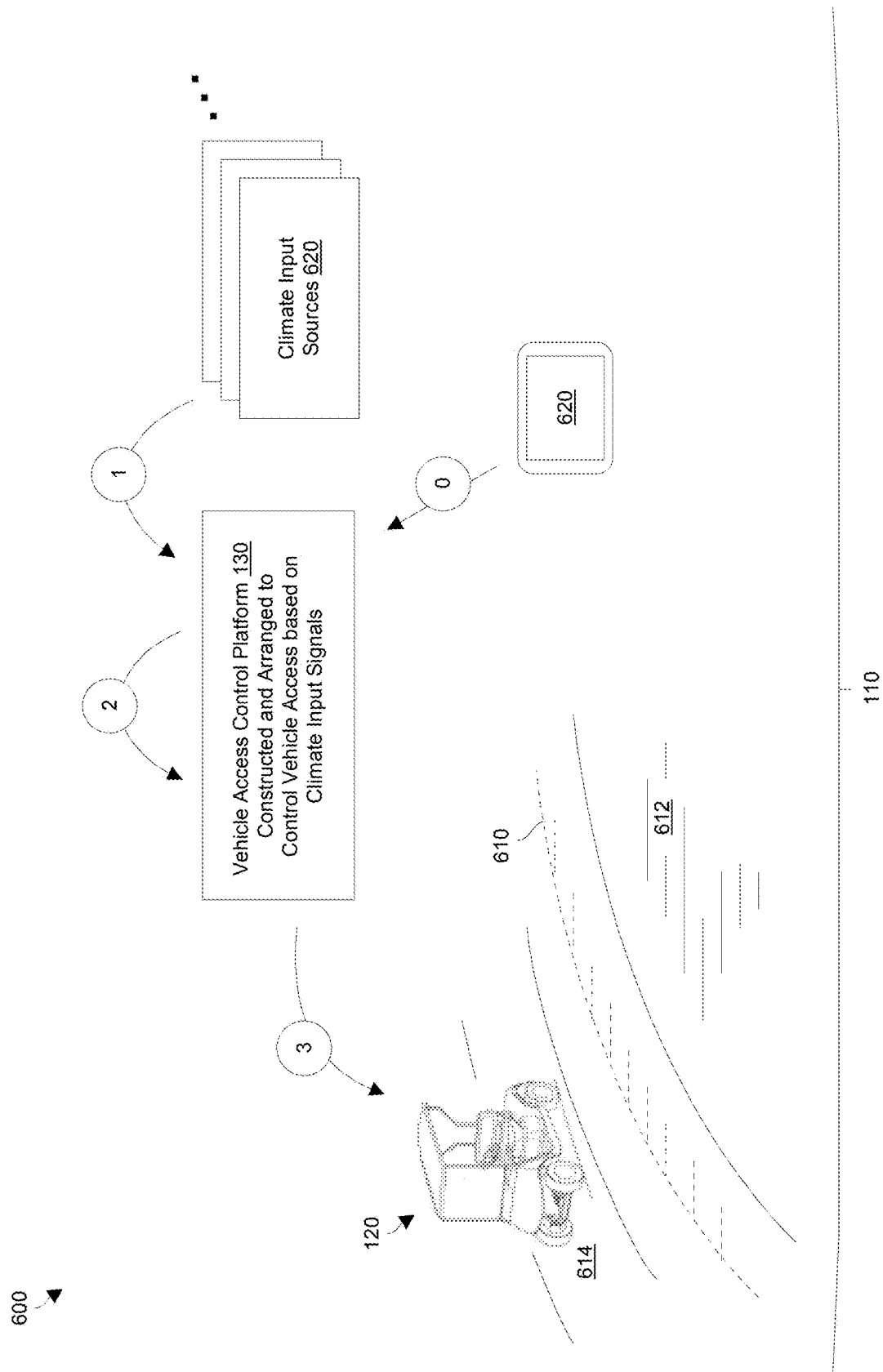
FIG. 6 is a diagram shows certain operations which are performed using the vehicle access control platform in accordance with certain embodiments.

FIG. 6 shows a view 600 of certain activities involved in managing vehicle access within a geographic region 110 (FIG. 1) based on climate input in accordance with certain embodiments. The geographic region 110 is covered in part by a set of geofenced areas (or geofences) 610.

By way of example only, the geographical region 110 is a golf course, and a particular geofenced area (or simply geofence) 610 overlies a fairway 612. Along these lines, the fairway 612 is to be protected from golf cart traffic under certain conditions. However, a cart path 614 running along the fairway 612 does not need to be protected from golf cart traffic is not covered by the geofence 610.

Prior to managing vehicle access, a user may configure the vehicle access control platform 130 with a set of rules that controls when the vehicles 120 (also see the utility vehicle 200 in FIG. 2) operate in a normal mode and when the vehicles 120 operate in a restricted mode. When the vehicles 120 are in the normal mode, the vehicles 120 may drive within the set of geofenced areas 610. However, when vehicles 120 are in the restricted mode, the vehicles 120 are not permitted to drive within the set of geofenced areas. When configuring the vehicle access control platform 130 with the set of rules, the user may enter the rules via a user interface 620. This prior activity is illustrated in FIG. 6 by the arrow (0).

Then, when managing vehicle access, the vehicle access control platform 130 receives a set of climate input signals from one or more climate input sources 620 (also see the other equipment 130 in FIG. 1). This activity is illustrated in FIG. 6 by the arrow (1). The set of climate input signals defines climate conditions (or simply climate) for the geographic region 110.

The climate input sources 620 may include one or more remote cloud servers (e.g., national weather forecasting services), local equipment (e.g., local radar and/or other local weather forecasting services), equipment installed within or in the vicinity of the geographical region 110 (e.g., environmental sensors installed on the golf course), combinations thereof, etc. The set of climate signals may be received (or gathered) by the vehicle access control platform 130 periodically (e.g., automatically updated every 5-10 minutes) and/or continuously (e.g., in an ongoing manner in real time).

Based on the set of climate signals from the climate input sources 620, the vehicle access control platform 130 performs a climate assessment operation that assesses whether to allow vehicle access within the set of geofences 610. Along these lines, the vehicle access control platform 130 may apply a set of rules to the climate input defined by the set of climate signals and generate a result that provides the most conservative outcome to transition from a normal mode to a restricted mode which prevents the vehicles 120 from accessing the set of locations covered by the set of geofences 610. This activity is illustrated in FIG. 6 by the arrow (2).

An example set of rules may be as follows:
If in normal mode, transition to restricted mode if chance of rain predicted by National Weather Service (NWS) is greater than 60% within the next 30 minutes
If in normal mode, transition to restricted mode if rain forecasted by Local Radar Service (LRS) is greater than 0.5 inches of within the next 2 hours
If in normal mode, transition to restricted mode if current soil moisture is greater than 20%
If in normal mode, transition to restricted mode if current ground temperature is less than 39° F.

Accordingly, if one or more of the rules is satisfied, the climate assessment operation determines that normal mode should transition to restricted mode.

Another example would require all of the rules (or a combination of criteria) to be satisfied before transitioning the vehicles 120 from the normal mode to the restricted mode.

Then, based on a result of the climate assessment operation, the vehicle access control platform 130 provides an access control signal (e.g., a wireless transmission) which controls vehicle access to the set of geofenced areas overlying the geographic region. Along these lines, if the result of the climate assessment operation indicates that vehicles 120 should be restricted, the access control signal informs the vehicles 120 that access to the set of geofences 610 is now prohibited. This activity is illustrated in FIG. 6 by the arrow (3).

In response, the vehicle 120 switches from operating in the normal mode to operating in the restricted mode to avoid driving in the set of restricted areas. For example, the restricted mode may be a "cart path only" restriction that allows golf carts to only drive on cart paths in order to protect golf course fairways (or other golfing locations) from damage. Along these lines, it should be understood that, prior to receiving the access control signal from the vehicle access control platform 130, the vehicle 120 operated in the normal mode which permitted the vehicle 120 to drive within the set of geofenced areas 610 (e.g., see the fairway 612 in FIG. 6) and outside the set of geofenced areas 610 (e.g., see the cart path 614 in FIG. 6). However, after receiving the access control signal from the vehicle access control platform 130, the vehicle 120 operates in the restricted mode which prohibits the vehicle 120 from driving within the set of geofenced areas 610 (e.g., see the fairway 612) but still permits the vehicle 120 to drive outside the set of geofenced areas 610 (e.g., see the cart path 614).

It should be understood that the operation of the vehicle access control platform 130 continues in an ongoing manner. Accordingly, if none of the rules to transition to restricted mode were satisfied, the vehicle access control platform 130 may reapply the rules again going forward to potentially transition to restricted mode at a later time (e.g., continuously, periodically such as every 10 minutes, and so on). Once any of the rules is satisfied (a conservative strategy to protecting the fairway 612), the vehicle access control platform 130 makes the decision to transition the vehicles 120 from the normal mode to the restricted mode.

Similarly, the vehicle access control platform 130 may apply another set of rules to the climate input defined by the set of climate signals and generate another result that transitions the vehicles 120 from the restricted mode back to the normal mode.

An example other set of rules may be as follows:
If in restricted mode, transition to normal mode if chance of rain predicted by National Weather Service (NWS) is greater than 10% within the next 30 minutes
If in restricted mode, transition to normal mode if rain forecasted by Local Radar Service (LRS) is less than 0.1 inches of within the next 2 hours
If in restricted mode, transition to normal mode if current soil moisture is greater than 5%
If in restricted mode, transition to normal mode if current ground temperature is above than 45° F.

Accordingly, if one or more of these other rules is satisfied, the climate assessment operation determines that restricted mode should transition back to normal mode.

Another example would require all of the rules (or a combination of criteria) to be satisfied before transitioning the vehicles 120 from the restricted mode back to the normal mode.

It should be understood that the rules for transitioning the vehicles 120 between modes may be embellished, modified, deleted, and so on, over time. To enter, modify, delete, etc. the various rules, the vehicle access control platform 130 may be accessed via the interface 620. Further details will now be provided with reference to FIG. 7.

Figure 7:
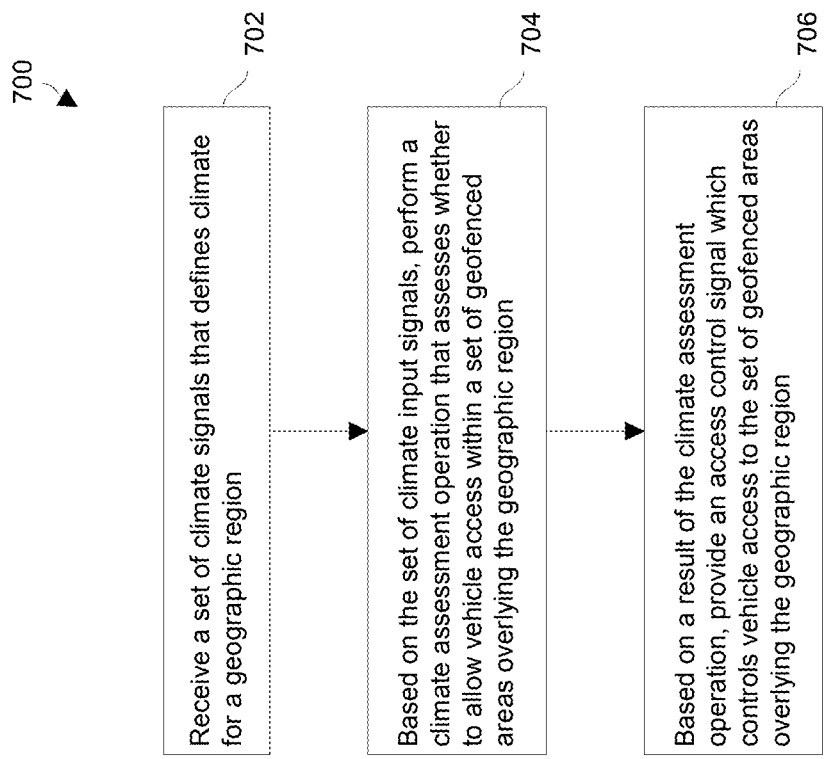
FIG. 7 is a flowchart of a procedure for managing vehicle access based on climate input signals in accordance with certain embodiments.

FIG. 7 is a flowchart of a procedure 700 for managing vehicle access within a geographic region. Such a procedure 700 may be performed by specialized circuitry to protection certain locations within the geographic region from damage if vehicles were to otherwise drive over those location.

At 702, the specialized circuitry receives a set of climate input signals that defines climate for the geographic region. Such climate input may be received from third party services (e.g., national weather services, local services, etc.) and/or local equipment (e.g., on-site soil sensors, wind sensors, humidity sensors, etc.).

At 704, the specialized circuitry performs, based on the set of climate input signals, a climate assessment operation that assesses whether to allow vehicle access within a set of geofenced areas overlying the geographic region. In some arrangements, the specialized circuitry applies a set of rules to the climate input to decide whether to allow vehicle access. Such rules may be modified over time.

At 706, the specialized circuitry provides, based on a result of the climate assessment operation, an access control signal which controls vehicle access to the set of geofenced areas overlying the geographic region. In some arrangements, the access control signal is a simple command directing the vehicles to transition from a normal operating mode to a restricted mode. In other arrangements, the access control signal includes a list of geofences that now have restrictions (e.g., to prevent driving, to lower the speed limit, to only permit reverse, etc.).

As described above, improved techniques are directed to managing vehicle access within geographic regions 110 based on climate input signals 170. Such techniques involve control circuitry 130 performing climate assessment operations based on the climate input signals 170 to determine whether to allow vehicle access within geofenced areas overlying the geographic regions 110. In some arrangements, the control circuitry 130 toggles vehicle access within geofenced areas based on input from national weather services, local weather stations, real time input from sensors installed within the geofenced areas, combinations thereof, etc. With such integration of climate input with geofencing technology, the control circuitry 130 is able to permit (or allow) vehicle access to the geofenced areas under certain weather conditions (e.g., good weather) and subsequently restrict vehicle access to the geofenced areas under other weather conditions (e.g., frost, soggy ground conditions, etc.) to protect the geofenced areas from damage.

While various embodiments of the present disclosure have been particularly shown and described, it will be understood by those skilled in the art that various changes in form and details may be made therein without departing from the spirit and scope of the present disclosure as defined by the appended claims.

For example, it should be understood that the vehicle access control platform 130 may control vehicle access for geofences based on criteria other than climate. Along these lines, the vehicle access control platform 130 may use geofences to permanently prevent access to only certain types of vehicles, to operate certain types of equipment, and so on.

Additionally, the improvements disclosed herein may be combined with other features such as one which disables the restricted mode under certain situations such as an emergency event such as an imminent weather emergency condition. Accordingly, the vehicles are able to perform quick escape from the golf course in response to the event.

It should be understood that some golf car fleet management solutions involve using GPS devices that allow golf courses to operate efficiently while also improving the golfing experience. Such GPS devices may further help provide course information to the golfer such as video hole flyovers, terrain data, hole numbers, distances to greens, food and beverage options, etc. Such GPS devices also may provide input to the golf course operations team such as pace of play, vehicle locations, food and beverage orders, vehicle speeds, etc. The golf course operations team can also customize their golf course with geofences that prevent golf cars from traveling in areas that are not intended to be traveled in. These geofences can also be used to control vehicle access based on climate input.

Certain GPS devices provide fleet management services, mainly in the golf business. Such GPS devices offer golf course operators with tools that allow them to create zones "geofences" around their property that can control the vehicles when they enter a particular zone. One common zone that most courses use is called a keep out zone. This zone is designed to prevent a select type of vehicle from entering the zone. A specific kind of keep out zone can be called a cart path only zone "CPO". The GPS devices offer an easy way for course operators to toggle on and off these zones at any time when they deem carts should remain on the cart path. The most common case for toggling this zone on is when it rains to prevent turf damage. One way to achieve such toggling is to performing this manually zone by zone, e.g., performed a person at the golf course with access to a specialized website that controls the GPS devices.

In accordance with certain embodiments, specialized control circuitry of a vehicle access control platform integrates real time weather conditions and an infrastructure that uses GPS devices to toggle the CPO zones on and off automatically.

This automation of an otherwise manual process is beneficial because no other fleet management mechanism integrates with any on-site hardware or cloud based software to restrict users from traveling in certain areas based on weather conditions.

In accordance with certain embodiments, the GPS technology integrates with one or more weather companies offering weather services to golf courses and similar establishments. Through integration with these companies, there is now the ability to tell the GPS technology if an active weather event is occurring at a site. The GPS technology then generates a visual message to the golfers, notifying them of the weather event. The GPS technology also disables geofences to allow for a quick exit of the course, in the event of an emergency.

This integration is capable of doing the opposite as well. Along these lines, it would use weather prediction data along with real time course data to enable (rather than disable) geofences.

It should be appreciated that certain disclosed improvements may work in a few different ways. One way is if the course has a weather station on-site that is feeding the GPS technology with real time weather conditions. For example the course can set a rain threshold that if too much precipitation is recorded in a given amount of time, the CPO rules decide to turned on CPO mode. Some courses have special sensors in the ground that measure the ground moisture. This is another tool that may help provide localized CPO fences turned on/off rather than the entire course.

Another way is by using a cloud based method that uses predictive weather sources or actual weather precipitation at the nearest national weather station. For example, a course could have a setting enabled that if the chance of rain is >70% within the next 10 hours, the specialized circuitry enables CPO mode. As yet another example, if the actual recorded rainfall is >0.5", the specialized circuitry enables CPO mode for X hours.

Yet another way is related to temperature and frost damage. Frost delays are a common thing for many courses up north. If the grass is frozen in the morning it can be damaged beyond repair if vehicle traffic drives over the frozen grass. Real time weather information can inform the club and the specialized circuitry may enable CPO mode if the conditions for frost delay are true. Such modifications and enhancements are intended to belong to various embodiments of the disclosure.

What is claimed is:

1. A method of managing vehicle access within a geographic region, the method comprising:

receiving a set of climate input signals that defines climate for the geographic region;

based on the set of climate input signals, performing a climate assessment operation that assesses whether to allow vehicle access within a set of geofenced areas overlying the geographic region; and based on a result of the climate assessment operation, providing an access control signal which controls vehicle access to the set of geofenced areas overlying the geographic region;

wherein the set of geofenced areas covers a set of golfing locations on a golf course;

wherein providing the access control signal includes:

outputting, as the control signal, a cart path only signal indicating whether passenger carrying golf carts are permitted within the set of geofenced areas; and wherein outputting the cart path only signal indicating whether passenger carrying golf carts are permitted within the set of geofenced areas includes:

wirelessly transmitting the cart path only signal to a fleet of passenger carrying golf carts equipped to selectively operate within the geographic region (i) in only non-geofenced areas or (ii) in both the non-geofenced areas and the set of geofenced areas based on the cart path only signal.

2. The method of claim 1 wherein the set of climate input signals is received from a remote cloud server operated by a third party service that is separate from an entity operating the golf course, the set of climate input signals providing a local weather forecast for the geographic area; and wherein performing the climate assessment operation includes:

generating the result of the climate assessment operation based on the local weather forecast upon receipt of the set of climate input signals from the remote cloud server.

3. The method of claim 1 wherein the set of climate input signals is received from a local radar-based weather service that is separate from an entity operating the golf course, the set of climate input signals providing real-time radar-based weather data for the geographic area; and wherein performing the climate assessment operation includes:

generating the result of the climate assessment operation based on the real-time radar-based weather data upon receipt of the set of climate input signals from the local radar-based weather service.

4. The method of claim 1 wherein the set of climate input signals identifies a set of measurements obtained from a set of environmental sensors installed on the golf course; and wherein performing the climate assessment operation includes:

generating the result of the access assessment operation based on the set of measurements obtained from the set of environmental sensors installed on the golf course.

5. The method of claim 1 wherein the result of the climate assessment operation indicates wet weather; and wherein the cart path only signal prevents the passenger carrying golf carts from driving within the set of geofenced areas to protect the golf course in response to the result of the climate assessment operation indicating wet weather.

6. The method of claim 5, further comprising:

after outputting the cart path only signal, receiving a new set of climate input signals that defines new climate for the geographic region;

based on the new set of climate input signals, performing another climate assessment operation that provides a new result indicating drier weather; and providing another cart path only signal that permits passenger carrying golf carts to drive within the set of geofenced areas to allow normal golf cart use within the set of geofenced areas in response to the new result indicating wet weather.

7. The method of claim 5, further comprising:

after outputting the cart path only signal, receiving a new set of climate input signals that defines new climate for the geographic region;

based on the new set of climate input signals, performing another climate assessment operation that provides a new result indicating an imminent weather emergency condition; and providing another cart path only signal that permits passenger carrying golf carts to drive within the set of geofenced areas to enable quick escape from the golf course in response to the new result indicating the imminent weather emergency condition.

8. The method of claim 1 wherein the result of the climate assessment operation indicates ground frost conditions; and wherein the cart path only signal prevents the passenger carrying golf carts from driving within the set of geofenced areas to protect the golf course in response to the result of the climate assessment operation indicating ground frost conditions.

9. The method of claim 1 wherein the set of climate input signals defines a set of weather conditions that applies to the golf course over a period of time; and wherein performing the climate assessment operation includes:

applying a set of rules to the set of weather conditions defined by the set of climate input signals to generate the result of the climate assessment operation.

10. The method of claim 9, further comprising:

prior to applying the set of rules, presenting a user interface to a golf course operator;

receiving, from the golf course operator through the user interface, a set of weather criteria for prohibiting passenger carrying golf carts from driving within the set of geofenced areas; and establishing the set of rules from the set of weather criteria.

11. The method of claim 9, further comprising:

prior to applying the set of rules, presenting a user interface to a golf course operator;

receiving, from the golf course operator through the user interface, a set of weather criteria for allowing passenger carrying golf carts to drive within the set of geofenced areas; and establishing the set of rules from the set of weather criteria.

12. The method of claim 1, further comprising:

wirelessly receiving golf cart location signals from the fleet of passenger carrying golf carts to confirm whether the fleet of passenger carrying golf carts is selectively operating within the geographic region (i) in only non-geofenced areas or (ii) in both the non-geofenced areas and the set of geofenced areas.

13. The method of claim 1 wherein wirelessly transmitting the cart path only signal to the fleet of passenger carrying golf carts includes:

wirelessly restricting operation of multiple passenger carrying golf carts on the golf course.

14. Electronic equipment to manage vehicle access within a geographic region, the electronic equipment comprising:
a set of interfaces;
memory which stores a set of instructions; and
processing circuitry coupled with the set of interfaces and the memory, the processing circuitry being constructed and arranged to, when operating in accordance with the set of instructions stored in the memory, perform a method of:
receiving, through the set of interfaces, a set of climate input signals that defines climate for the geographic region,
based on the set of climate input signals, performing a climate assessment operation that assesses whether to allow vehicle access within a set of geofenced areas overlying the geographic region, and
based on a result of the climate assessment operation, providing an access control signal which controls vehicle access to the set of geofenced areas overlying the geographic region;
wherein the set of geofenced areas covers a set of golfing locations on a golf course;
wherein providing the access control signal includes:
outputting, as the control signal, a cart path only signal indicating whether passenger carrying golf carts are permitted within the set of geofenced areas; and
wherein outputting the cart path only signal indicating whether passenger carrying golf carts are permitted within the set of geofenced areas includes:
wirelessly transmitting the cart path only signal to a fleet of passenger carrying golf carts equipped to selectively operate within the geographic region (i) in only non-geofenced areas or (ii) in both the non-geofenced areas and the set of geofenced areas based on the cart path only signal.

15. The electronic equipment of claim 14 wherein the set of climate input signals defines a set of weather conditions that applies to the golf course over a period of time; and
wherein performing the climate assessment operation includes:
applying a set of rules to the set of weather conditions defined by the set of climate input signals to generate the result of the climate assessment operation.

16. The electronic equipment of claim 15 wherein performing the climate assessment operation includes:
generating the result of the climate assessment operation based on (i) a local weather forecast from a remote cloud server, (ii) real-time radar-based weather data from a local radar-based weather service, and (iii) a set of measurements obtained from a set of environmental sensors installed on the golf course.

17. The electronic equipment of claim 14 wherein the result of the climate assessment operation indicates ground frost conditions; and
wherein the cart path only signal prevents the passenger carrying golf carts from driving within the set of geofenced areas to protect the golf course in response to the result of the climate assessment operation indicating ground frost conditions.

18. A computer program product having a non-transitory computer readable medium which stores a set of instructions to manage vehicle access within a geographic region; the set of instructions, when carried out by computerized circuitry, causing the computerized circuitry to perform a method of:
receiving a set of climate input signals that defines climate for the geographic region;
based on the set of climate input signals, performing a climate assessment operation that assesses whether to allow vehicle access within a set of geofenced areas overlying the geographic region; and
based on a result of the climate assessment operation, providing an access control signal which controls vehicle access to the set of geofenced areas overlying the geographic region;
wherein the set of geofenced areas covers a set of golfing locations on a golf course;
wherein providing the access control signal includes:
outputting, as the control signal, a cart path only signal indicating whether passenger carrying golf carts are permitted within the set of geofenced areas; and
wherein outputting the cart path only signal indicating whether passenger carrying golf carts are permitted within the set of geofenced areas includes:
wirelessly transmitting the cart path only signal to a fleet of passenger carrying golf carts equipped to selectively operate within the geographic region (i) in only non-geofenced areas or (ii) in both the non-geofenced areas and the set of geofenced areas based on the cart path only signal.

19. The computer program product of claim 18 wherein the result of the climate assessment operation indicates ground frost conditions; and
wherein the cart path only signal prevents the passenger carrying golf carts from driving within the set of geofenced areas to protect the golf course in response to the result of the climate assessment operation indicating ground frost conditions.

* * * * *